United States Patent [19]
Vanderbrook

[11] Patent Number: 6,154,272
[45] Date of Patent: Nov. 28, 2000

[54] CONTROL TOOL FOR AND A METHOD OF CALIBRATING A PHOTOGRAPHIC PROCESSOR AND PHOTOGRAPHIC PRINTER

[75] Inventor: Peter Vanderbrook, Rush, N.Y.

[73] Assignee: Eastman Kodak Company, Rochester, N.Y.

[21] Appl. No.: 09/170,659

[22] Filed: Oct. 13, 1998

[51] Int. Cl.[7] .......................... G03B 27/32; G03B 27/52; G03B 41/00; G03C 7/00
[52] U.S. Cl. .............................. 355/77; 355/40; 396/563; 430/359
[58] Field of Search ................................ 355/40, 77, 133, 355/38, 35; 378/207; 396/563, 578; 348/19; 356/404, 425; 430/359, 30

[56] References Cited

U.S. PATENT DOCUMENTS

| | | | |
|---|---|---|---|
| 3,292,488 | 12/1966 | Griffith | 355/38 |
| 3,674,364 | 7/1972 | Korman | 355/38 |
| 3,797,933 | 3/1974 | Sable | 355/35 |
| 3,937,573 | 2/1976 | Rising | 355/83 |
| 4,101,216 | 7/1978 | Grossmann | 355/35 |
| 4,168,120 | 9/1979 | Freier et al. | 355/38 |
| 4,211,558 | 7/1980 | Oguchi et al. | 430/359 |
| 4,417,818 | 11/1983 | Weisner | 356/404 |
| 4,611,918 | 9/1986 | Nishida et al. | 356/404 |
| 4,657,378 | 4/1987 | Hope et al. | 355/38 |
| 4,764,793 | 8/1988 | Goll et al. | 355/38 |
| 4,977,521 | 12/1990 | Kaplan | 382/254 |
| 5,063,583 | 11/1991 | Galkin | 378/207 |
| 5,083,154 | 1/1992 | Terashita et al. | 355/68 |
| 5,210,570 | 5/1993 | Minamisawa et al. | 355/38 |
| 5,223,891 | 6/1993 | Fierstein et al. | 355/77 |
| 5,235,369 | 8/1993 | Nakamura et al. | 396/569 |
| 5,262,821 | 11/1993 | Hosoya | 355/35 |
| 5,313,251 | 5/1994 | Fierstein et al. | 355/77 |
| 5,319,408 | 6/1994 | Shiota | 396/569 |
| 5,649,260 | 7/1997 | Wheeler et al. | 396/569 |
| 5,661,544 | 8/1997 | Ishikawa et al. | 355/41 |
| 5,841,519 | 11/1998 | Ajimu et al. | 355/40 |
| 5,877,787 | 3/1999 | Edge | 347/19 |

FOREIGN PATENT DOCUMENTS

| | | |
|---|---|---|
| 0 751 420 | 1/1997 | European Pat. Off. . |
| 0 857 998 | 8/1998 | European Pat. Off. . |

*Primary Examiner*—Russell Adams
*Assistant Examiner*—Rodney Fuller
*Attorney, Agent, or Firm*—Frank Pincelli

[57] ABSTRACT

A control tool and method for calibrating a photographic printer and a photographic processor. The tool comprises an exposed unprocessed photographic filmstrip having a first image section for use in calibrating a photographic printer and a second image section for use in calibrating a photographic processor with respect to a predetermined aim. The first image section comprises a plurality of exposures of the same image, each image having a different exposure level, and the second image section comprising a plurality of density patches, each having a different exposure level. The exposed tool is developed so to determine the exposure levels. The exposure levels are compared with predetermined aims. The tool is printed if the measured data is within prescribed limits, or the film processor is adjusted in accordance with corrective measures if the measured data is outside said prescribed limits.

8 Claims, 1 Drawing Sheet

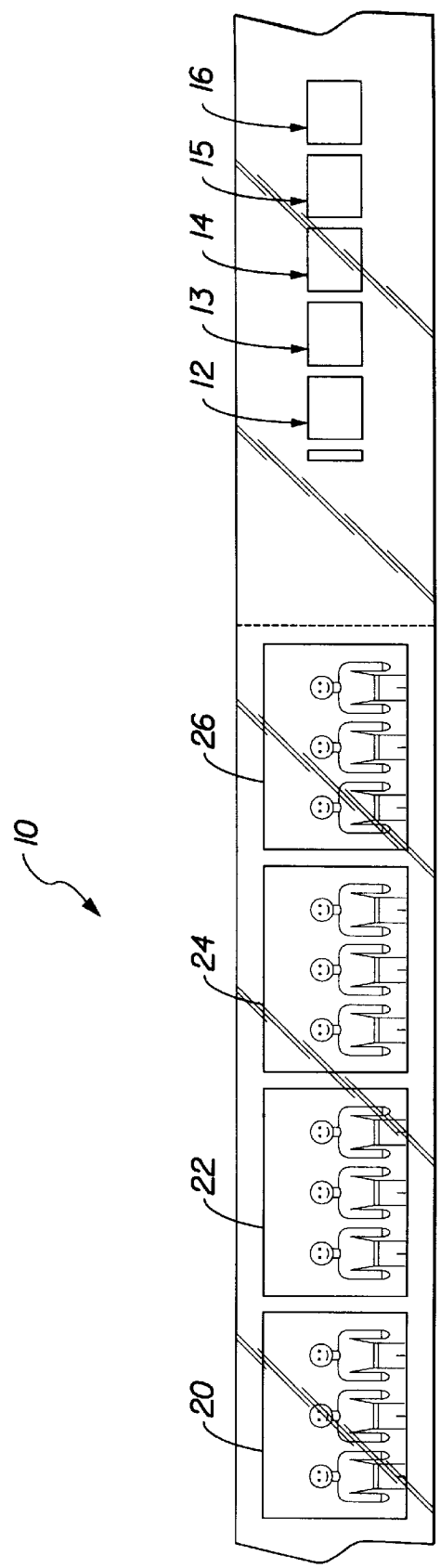

CONTROL TOOL FOR AND A METHOD OF CALIBRATING A PHOTOGRAPHIC PROCESSOR AND PHOTOGRAPHIC PRINTER

FIELD OF THE INVENTION

The present invention is directed to a tool for monitoring and controlling a photographic processor and photographic printer in a typical processing facility or laboratory.

BACKGROUND OF THE INVENTION

A typical wholesale photofinishing lab or facility currently use monitoring systems which are fragmented, costly, technically cumbersome and not representative of the specific operation parameters or customers/markets served by the photofinishing laboratory or facility.

Current monitoring systems for monitoring film processors and printers in a typical photofinishing facility are done daily, but in separate non-linked steps. A film processor is typically monitored through the use of a film process tool, which comprises an exposed strip of film which contains a plurality of patches of varying densities. Once the exposures have been developed, the density of the patches are measured and compared to aims. Deviations from the aim indicate if the chemicals are performing as required. If measured densities vary beyond predetermined parameters, corrective action is typically taken. Though the standards established may well represent technically well derived aims, they usually bear little similarity to the equipment, chemistry, or the configuration that exists in the particular lab environment.

Currently there exists an array of printer setup and printer balancing kits available from various film manufacturers and other quality tool suppliers, most, if not all, embody a set of processed negatives and various common film types in a standard or referenced print for setup comparison. A typical printer setup tool comprises calibrated negatives that when printed or matched to aims to determine correct output. Particularly, each negative has an area for measuring the print density, which is compared to aim. Printer setups are changed to make prints at the aimed density by making adjustments to exposure to compensate for the deviation from aim. Printer setup tools may be processed by the manufacturer or by the photofinishing lab depending upon the type of tool being used. Since tools are being provided by the manufacturer, the setup obtained by the tool may not be representative of current film coatings processed through the processing lab, or may be printed on paper stock which is different from the one currently used in the photofinishing lab and prepared on a printer and processor, not some other system being set up for control.

In addition to the foregoing problems, in a typical photofinishing lab the film process condition is not monitored at the time of processing the printer setup tool. Thus, the printer setup may be different due to film processing chemical conditions. It is important to be sure that film process chemical conditions are satisfactory at the time of the process of the printer control tool. Further, negatives from two different film process chemicals may require different printer setups even though both process chemicals are within limits. A further problem with the prior art printer control tool is that it is typically processed by the manufacturer and there is no link between the process chemical control tool and the processing chemicals of the customer films. As a result, printer setups always need compensation to produce the best color pictures.

The present invention provides a single control tool that has process monitor patches and printer setup negatives. The photofinishing lab can process the tool, and if the process monitor patch densities are within specification, the photofinisher knows that the printer setup negatives are within the specification and will adjust the printing equipment utilizing the tool. However, if the patches used to monitor the film processor indicates that there is a problem, the tool will not be used and adjustments are first made to the film processor until the densities of the tool are within limits, then the portion of the tool used for printer setup can be used for setting up of the printer. Thus, utilizing the present invention, the user will know that the film process chemicals are within prescribed limits and that the printer setup negative have also been processed properly. The present invention also assures the photofinisher that the tool he is using matches the customer film and at the exact time of processing the film process chemicals will perform as required. This is a significant advantage because photoprocessing chemical performance can be altered by small amounts of contamination, differences in processing time, or temperature, thus requiring frequent monitoring. The present invention provides a printer setup tool every time the photoprocessing chemicals are monitored providing the ability for the photofinisher to eliminate the photoprocess chemical variation from the variation color and density of the customer pictures.

SUMMARY OF THE INVENTION

The present invention is directed to overcoming one or more of the problems set forth above. Briefly summarized according to one aspect of the present invention, there is provided a control tool for use in calibrating a photographic printer and a photographic processor. The tool comprises an exposed unprocessed photographic filmstrip having a first image section for use in calibrating a photographic printer and a second image section for use in calibrating a photographic processor with respect to a predetermined aim. The first image section comprises a plurality of exposures of the same image, each image having a different exposure level, and the second image section comprising a plurality of density patches, each having a different exposure level.

In accordance with another aspect of the present invention, there is provided a method of calibrating a photographic processor and a photographic printer which uses the photographic material from the photographic processor.

The method comprises steps of:

a) providing an exposed unprocessed photographic filmstrip having a first image section for use in calibrating a photographic printer and a second image section for use in calibrating a photographic processor with respect to a predetermined aim, the first image section comprising a plurality of exposures of the same image, each having a different exposure level, the second image section comprising a plurality of density patches, each having a different exposure level;

b) processing the exposed processed photographic filmstrip in the processor;

c) measuring the developed photographic film so to determine the exposure level;

d) comparing the measured exposure levels with respect to predetermined aims; and e) printing the processed photographic film if the measured data is within prescribed limits or adjusting the film processor in accordance with corrective measures provided for the measured data if the measured data is outside said prescribed limits.

The above, and other objects, advantages and novel features of the present invention will become more apparent from the accompanying detailed description thereof when considered in conjunction with the following drawings.

BRIEF DESCRIPTION OF THE DRAWINGS

The drawing illustrates a control tool made in accordance with the present invention, which is designed for use in calibrating a photographic printer and a photographic processor.

DETAILED DESCRIPTION OF THE INVENTION

Referring to FIG. 1, there is illustrated monitor control tool 10 made in accordance with the present invention. The tool comprises an exposed undeveloped strip of photosensitive material. In the particular embodiment illustrated, the photosensitive material comprises a negative filmstrip. The tool 10 comprises a plurality of density patches 12, 13, 14, 15, 16. The density of the patches 12–16 after the tool 10 has been processed is measured using a transmission densitometer and the measurements obtained are used for control plotting or diagnosis of the process conditions. If the process conditions are not within prescribed limits, corrective actions are taken. The density of the patches 12–16 are selected to make the film sensitive to specific process chemical conditions that would require adjustments. This technology is well known to those of ordinary skill in the art and is currently practiced throughout the industry. In the particular embodiment illustrated, density patches 12–16 are D-max, D-min, low density, high density and yellow. Density aims will vary upon the application.

Example of aim status and densities are:

| Path | Red | Green | Blue | Tolerance | Patch ID |
|---|---|---|---|---|---|
| Yellow | 0.90 R | 1.50 G | 3.20 B | +/−.30 | (Y) |
| D-max | 2.05 R | 2.50 G | 3.10 B | +/−.30 | |
| High density | 1.40 R | 1.90 G | 2.33 B | +/−.30 | (HD) |
| Low density | 0.50 R | 1.00 G | 1.25 B | +/−.30 | (LD) |
| D-min | 0.20 R | 0.64 G | 0.90 | +/−.30 | |

Status M densities are used in the following way:

| | Aim tolerance | Action limits | Control limits | Color balance |
|---|---|---|---|---|
| D-min | +/−0.03 | +0.03 | +0.05 | NA |
| LD | +/−0.04 | +/−0.07 | +/−0.08 | NA |
| HD-LD | +/−0.03 | +/−0.07 | +/−0.09 | 0.09 |
| D-max(b) − Y(b) | +/−0.07 | +/−0.10 | +0.12 | NA |

After the densities are recorded and computations made, each resulting value is plotted on a graph that compares the result to the aim, the process control limit and the process action limit. Graphic results are compared to limits and if any limits are exceeded, corrective action must be taken. What action to take can be determined using a manual that has the instructions for the specific chemicals being monitored.

Definitions:

D-max—the highest density area on a specific film process monitor tool.

D-min—lowest densities measured on the process tool. This area is similar to an area that has not been exposed.

HD (high density)—the higher status M density of two areas used for calculating film contrast performance in tested chemicals.

LD (low density)—the lower status M density of two areas used for calculating film contrast performance in tested chemicals.

Y (yellow)—a patch which has mostly yellow exposure which results in very high blue density and low densities in the red and green, for calculation of processing chemical performance on high density areas of the film.

Stop (f stop)—one stop is equal to doubling exposure or cutting the exposure in half. A negative, which is one stop over-exposed, received double the exposure of a "normal" exposed negative. A negative, which is one stop under exposed, received one half the exposure of a "normal" exposed negative.

Typical printer setup filmstrips use a single scene exposed in an exposure series ranging from 2 stops under to 3 stops over and sometimes as high as 5 stops over (positions 20, 22, 24, and 26 on tool 10). These negatives are printed and the resulting prints need to match an aim to verify the printer will produce satisfactory prints from customer films. The "normal" frame is adjusted first by changing exposure relative to the "normal" film density. Over and under frames are adjusted using exposure compensations called "slope" which force the printer to make matched print densities of each of the scenes independent of the film exposure. Higher speed films in some applications may produce many more negatives with exposures greater than 3 stops over and require a printer setup tool which includes a 5 stop overexposed frame for use in setting over slope.

The tool 10 further includes scene images 20, 22, 24, 26, which are used for monitoring the printer setup and balance. The images 20, 22, 24 and 26 all relate to a single scene having a series of exposures ranging from 2 stops under to 3 stops over, and sometimes as high as 5 stops over. The images 20, 22, 24 and 26 are printed, and the resulting prints are matched to an aim to verify the printer will produce satisfying prints from the customer films. In the embodiment illustrated, the invention 20 comprises a scene composed of 3 individuals, each having a different reflective characteristic of their skin, posed with a background that is varying densities of non-selective color, for example, gray, and using digital transform process measuring patches, resolution patches and scene adjust patches. An example of simple images and methods which may be employed to produce such for images 20, 22, 24 and 26 are discussed in detail in U.S. Pat. No. 5,223,891 and U.S. Pat. No. 5,313,251, which are hereby incorporated by reference. It is to be understood that the scenes 20, 22, 24 and 26 may be made by any appropriate method, however, the method disclosed in these patents have been found to be quite satisfactory and useful in producing a high quality, reliable tool.

In order to more clearly understand the present invention, a brief description of its use will now be discussed. First, a tool 10, having the features described above, is obtained typically from a film manufacturer and then is run through a film processor wherein the images on the tool 10 are developed. The appropriate measurements are made with a densitometer to determine if the film processor is within specification. If it is, the tool 10 is then sent onto the printer for printing, however, if the film processor is not within the prescribed specifications, appropriate corrective action as is well known to those skilled in the art is taken and another tool 10 is then passed through the processor until the density measurements obtained for the tool 10 are within prescribed limits. Once this occurs, the tool 10, having met all of the appropriate criteria for the film processor, is sent onto a printer where the images are printed onto a photosensitive media, for example, paper. The printed images are then compared with appropriate aims to determine if corrective action is required. If so, the appropriate action is taken as is customarily done in the field.

The advantage of the present invention is that the tool 10, which is used to determine the printer setup, is processed in the same chemicals which the customer's negatives are to be produced by the operator. In addition, the monitoring is conducted at the same time at which the printer is being monitored. This is a significant advantage because photoprocessing chemical performance can be altered by small amounts of contamination, differences in processing time or temperature, thus requiring frequent monitoring. The present invention provides a printer setup tool every time the photoprocessing chemicals are monitored, providing the ability for a photofinisher to eliminate photoprocessing chemical variation from the variation in color and density of the customer pictures. Thus providing a more reliable and consistent product to the consumer.

It is to be understood that various other changes and modifications may be made without departing from the scope of the present invention, the present invention being limited by the following claims.

PARTS LIST

10 Tool
12–16 Patches
20 Images
22 Images
24 Images
26 Images

What is claimed is:

1. A control tool for use in calibrating a photographic printer and a photographic processor, comprising:

an exposed unprocessed photographic filmstrip having a first image section for use in calibrating a photographic printer and a second image section for use in calibrating a photographic processor with respect to a predetermined aim, said first image section comprising a plurality of exposures of the same image, each image having a different exposure level, said second image section comprising a plurality of density patches, each having a different exposure level, said control tool is used to calibrate said printer and said processor being processed in the same processing chemistry.

2. The control tool according to claim 1 wherein said plurality of exposures of the same image comprises four exposures.

3. The control tool according to claim 2 wherein said four exposures comprise:

a first normal exposure of the image, a two stop underexposed exposure of the image, a two and a half stop overexposed exposure of the image and a five stop overexposed exposure of the image.

4. A control tool according to claim 1 wherein said plurality of density patches comprises five.

5. A control tool according to claim 4 wherein said five density patches comprise a D-min density patch, a low density patch, a high density patch, a D-max density patch and a yellow patch.

6. A control tool according to claim 1 wherein said photographic processor comprises a film processor.

7. A method of calibrating a photographic processor and a photographic printer which uses the photographic material from said photographic processor, the method comprising steps of:

a) providing an exposed unprocessed photographic filmstrip having a first image section for use in calibrating a photographic printer and a second image section for use in calibrating a photographic processor with respect to a predetermined aim, said first image section comprising a plurality of exposure of the same image, each having a different exposure level, said second image section comprising a plurality of density patches, each having a different exposure level;

b) processing said exposed processed photographic filmstrip in said processor;

c) measuring said developed photographic film so to determine the exposure level;

d) comparing the measured exposure levels with respect to predetermined aims;

e) printing said processed photographic film if said measured exposure level is within prescribed limits, or adjusting said film processor in accordance with corrective measures provided for said measured data if said measured data is outside said prescribed limits; and f) determining the printer adjustment parameters based on said photographic measured data in said image section using the same process chemistry levels used to calibrate said processor if said measured exposure level of said image section is within prescribed limits.

8. A method of calibrating a photographic processor in a photographic printer according to claim 7 wherein said first image section for using in calibrating set photographic printer further comprises adjusting of the color balance and or slope of said photographic printer.

* * * * *